United States Patent [19]

Morimoto

[11] Patent Number: 5,020,392

[45] Date of Patent: Jun. 4, 1991

[54] TRANSMISSION RATIO CONTROL SYSTEM FOR A CONTINUOUSLY VARIABLE TRANSMISSION

[75] Inventor: Yoshihiko Morimoto, Mitaka, Japan

[73] Assignee: Fuji Jukogyo Kabushiki Kaisha, Tokyo, Japan

[21] Appl. No.: 273,162

[22] Filed: Nov. 18, 1988

Related U.S. Application Data

[63] Continuation of Ser. No. 30,032, Mar. 24, 1987, abandoned.

[30] Foreign Application Priority Data

Mar. 25, 1986 [JP] Japan .................................. 61-66829
Mar. 31, 1986 [JP] Japan .................................. 61-73694

[51] Int. Cl.$^5$ ............................................. B60K 41/14
[52] U.S. Cl. ..................................... 74/866; 74/867
[58] Field of Search ................. 74/866, 867, 868, 864, 74/877

[56] References Cited

U.S. PATENT DOCUMENTS

| | | | |
|---|---|---|---|
| 4,459,879 | 7/1984 | Miki et al. | 74/867 |
| 4,509,125 | 4/1985 | Fattic et al. | 74/866 X |
| 4,565,110 | 1/1986 | Ito | 74/867 X |
| 4,584,907 | 4/1986 | Niwa et al. | 74/866 |
| 4,594,916 | 6/1986 | Ito et al. | 74/867 X |
| 4,628,773 | 12/1986 | Itoh et al. | 74/868 X |
| 4,649,486 | 3/1987 | Oshiage | 74/866 X |
| 4,653,004 | 3/1987 | Osanai et al. | 74/866 X |
| 4,653,005 | 3/1987 | Osanai et al. | 74/866 X |
| 4,653,006 | 3/1987 | Osanai et al. | 74/866 X |
| 4,683,779 | 8/1987 | Osanai et al. | 74/866 X |
| 4,747,325 | 5/1988 | Morimoto | 74/866 |
| 4,794,819 | 1/1989 | Tanaka et al. | 74/868 X |

FOREIGN PATENT DOCUMENTS 217048 3/1988 Japan .
2159218A 11/1985 United Kingdom .................. 74/866

Primary Examiner—Dwight G. Diehl
Assistant Examiner—Harold F. Macris
Attorney, Agent, or Firm—Martin A. Farber

[57] ABSTRACT

A control system for a continuously variable transmission has a transmission ratio control valve having a spool for controlling oil supplied to a cylinder of a drive pulley to change the transmission ratio. The transmission ratio control valve has chamber at both ends of the spool. By controlling the flow rate of oil supplied to the chambers in accordance with a desired transmission ratio, the spool is shifted, so that the rate of change of the transmission ratio is controlled. The transmission ratio changing rate is corrected by the rate of change of the desired transmission ratio. Two coefficients representative of the degree of throttle opening and a physical condition such as viscosity are also generated to correct the transmission ratio changing rate.

14 Claims, 9 Drawing Sheets

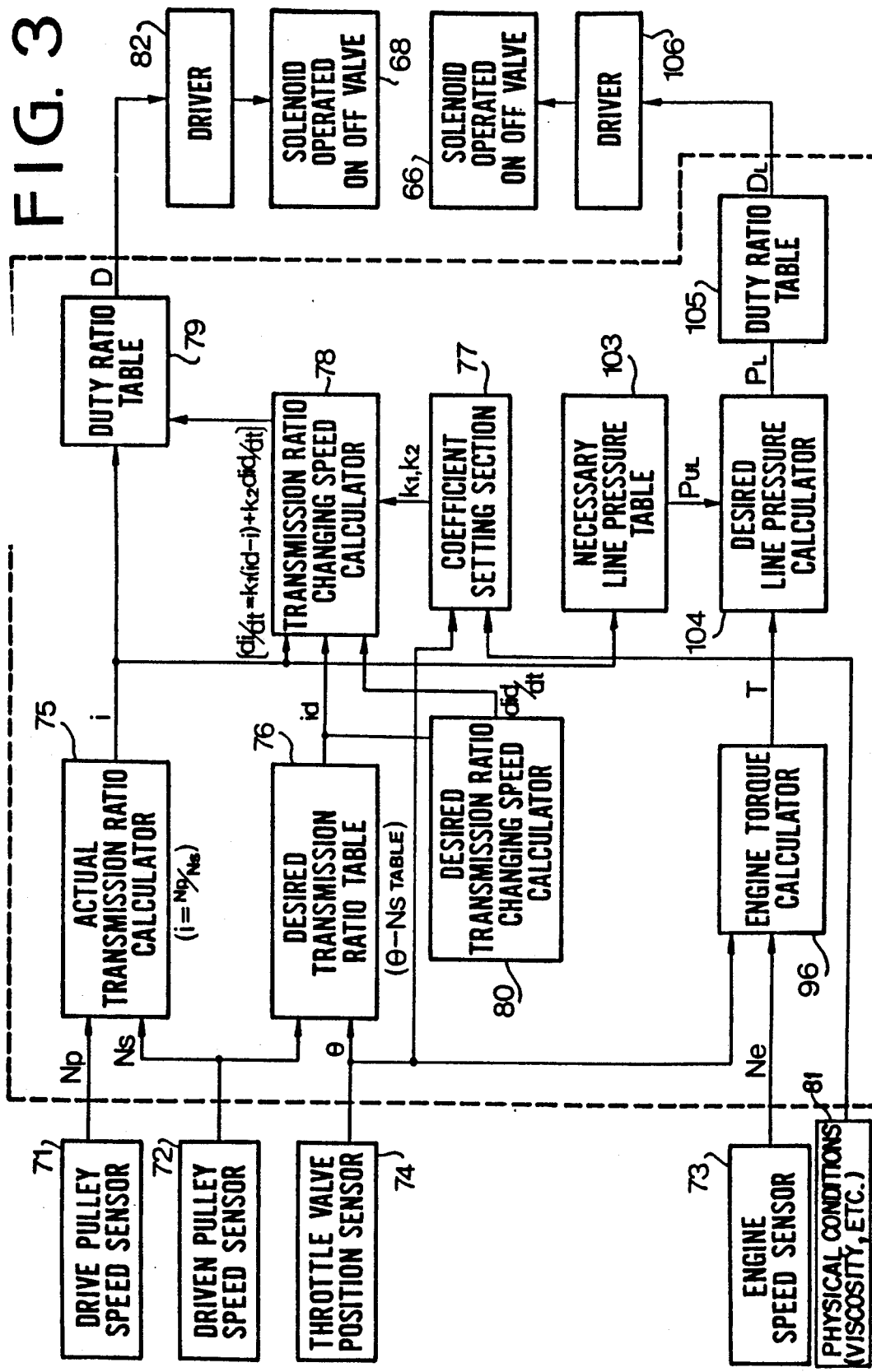

TRANSMISSION RATIO CONTROL SYSTEM FOR A CONTINUOUSLY VARIABLE TRANSMISSION

RELATED APPLICATION

This application is a continuation or our co-pending application Ser. No. 030,032, filed Mar. 24, 1987, now abandoned.

BACKGROUND OF THE INVENTION

The present invention relates to a control system for a continuously variable belt-drive automatic transmission for a motor vehicle, and more particularly to a system for controlling the transmission ratio at a minimum transmission ratio.

A known control system for a continuously variable belt-drive transmission comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a hydraulic circuit including a pump for supplying oil to the servo devices, a line pressure control valve and a transmission ratio control valve. Each valve comprises a spool to control the oil supplied to the servo devices.

The transmission ratio control valve operates to determine the transmission ratio in accordance with the opening degree of a throttle valve of an engine and the speed of the engine. The line pressure control valve is adapted to control the line pressure in accordance with the transmission ratio and the engine speed. The line pressure is controlled to prevent the belt from slipping on the pulleys in order to transmit the output of the engine.

When starting the vehicle, the transmission ratio is set at a maximum value. When the vehicle speed and engine speed reach set values under a driving condition, the transmission ratio starts to change (to upshift). The transmission ratio is automatically and continuously reduced at a speed which is determined by line pressure, the pressure of oil supplied to the servo device of the drive pulley, and the actual transmission ratio of the transmission. In such a system, the speed of changing of transmission ratio up to a desired transmission ratio can not be controlled in accordance with driving conditions. Accordingly, hunting or overshooting of the transmission ratio occurs, which decreases the driveability of the vehicle.

Japanese Patent Laid Open 59-159456 discloses a system provided with a first valve for changing the direction of the transmission ratio change and a second valve for controlling the transmission ratio changing speed. By controlling the spool of the second valve, the transmission ratio changing speed is controlled. However, the system is complicated in construction, since two control valves are provided in addition to the conventional system.

Japanese Patent Laid Open 59-217048 shows a system which operates to vary a desired transmission ratio in accordance with the deviation of an actual transmission ratio from the desired ratio. However, such a system causes overshooting of the control operation.

SUMMARY OF THE INVENTION

The object of the present invention is to provide a system which has a fast response thereby preventing overshooting of the control.

The other objects and features of this invention will become understood from the following description with reference to the accompanying drawings.

BRIEF DESCRIPTION OF DRAWINGS

FIG. 3 is a block diagram showing a control unit;

DETAILED DESCRIPTION OF THE PREFERRED EMBODIMENT

Figure 1:
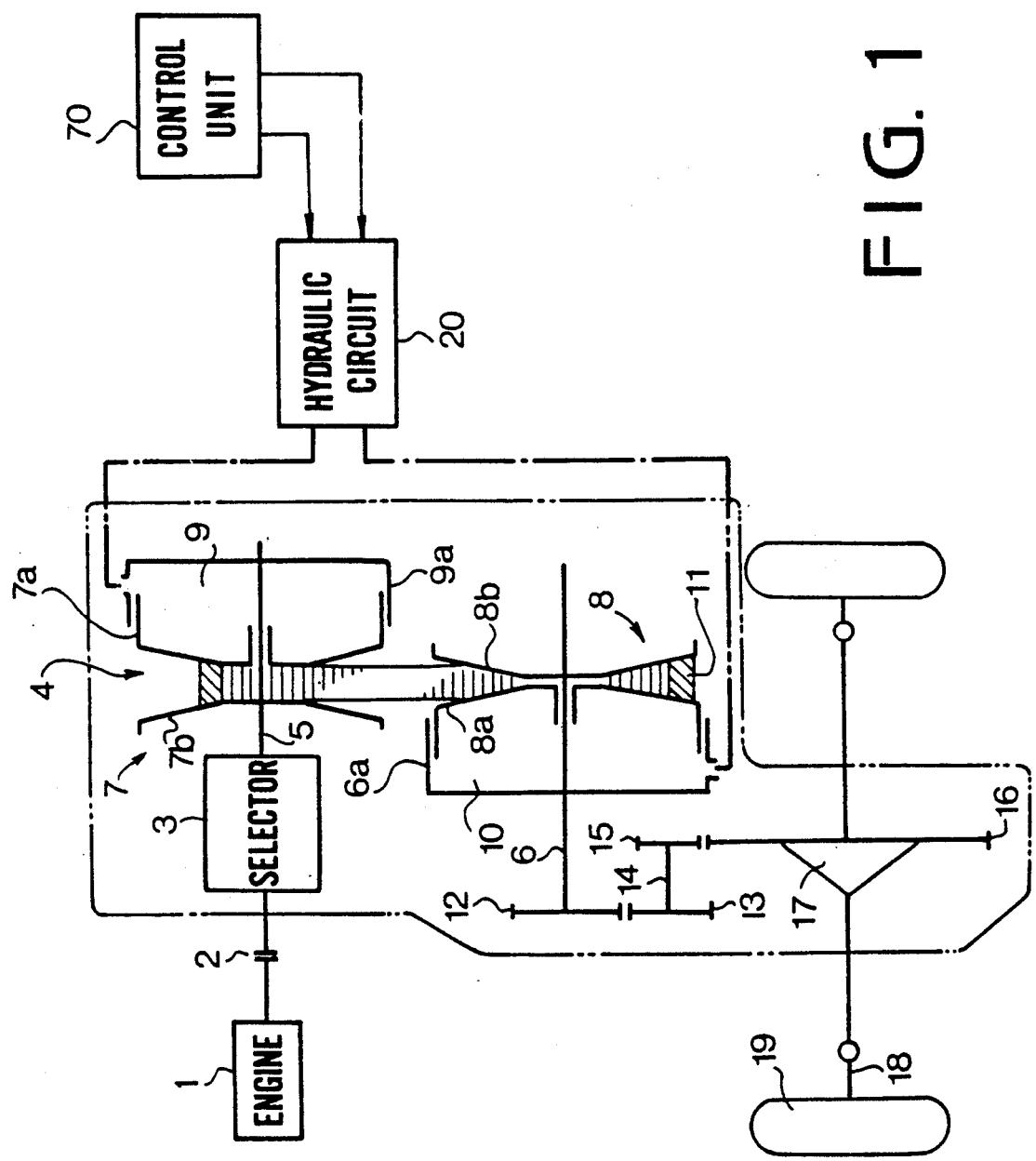
FIG. 1 is a schematic illustration of a continuously variable belt-drive transmission.

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on the shafts 5 and 6 respectively. A fixed conical disc 7b of the drive pulley 7 is integral with the main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

Figure 2A:
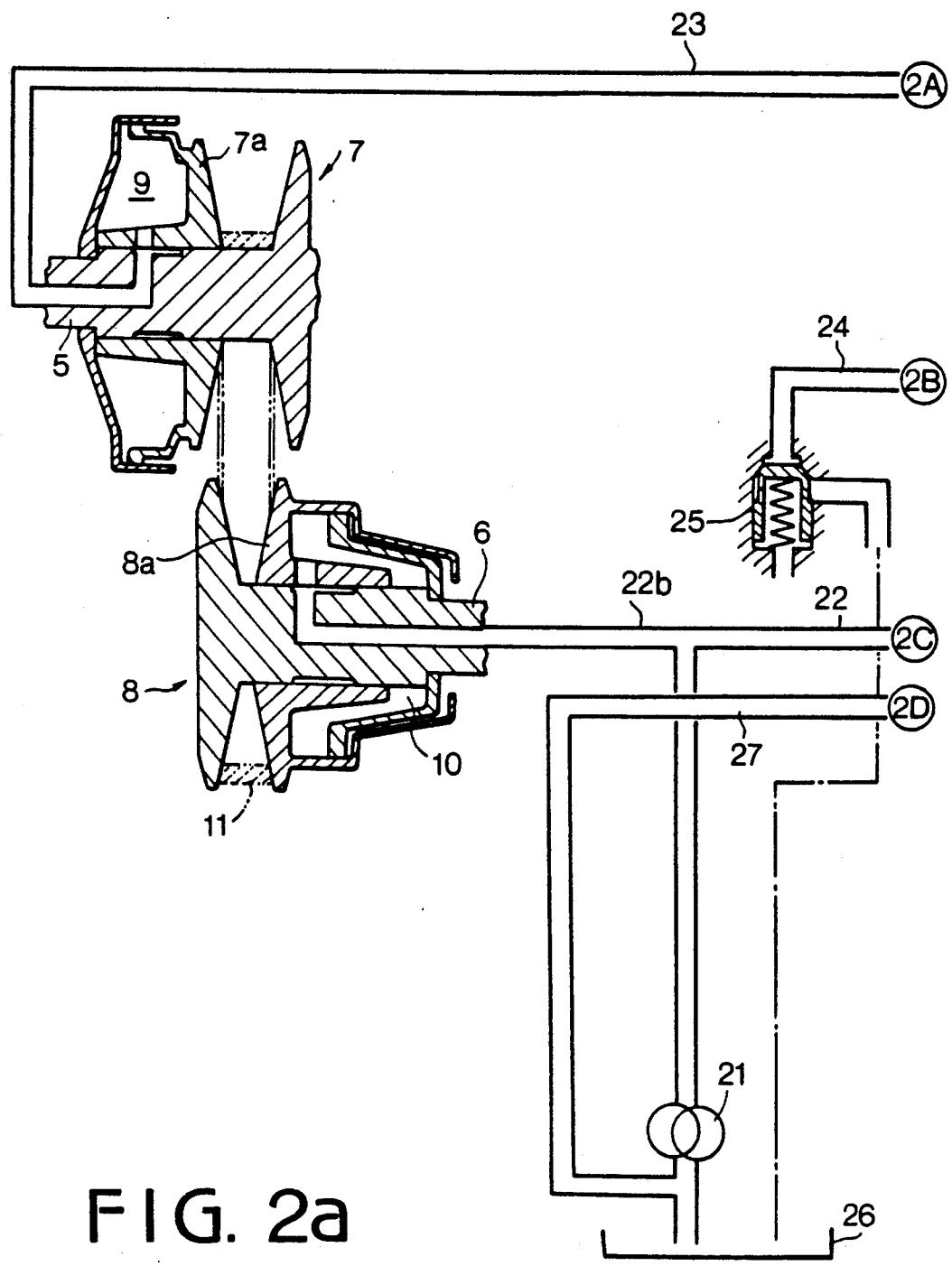
FIGS. 2a and 2b are schematic diagrams showing a control system according to the present invention.
Figure 2B:
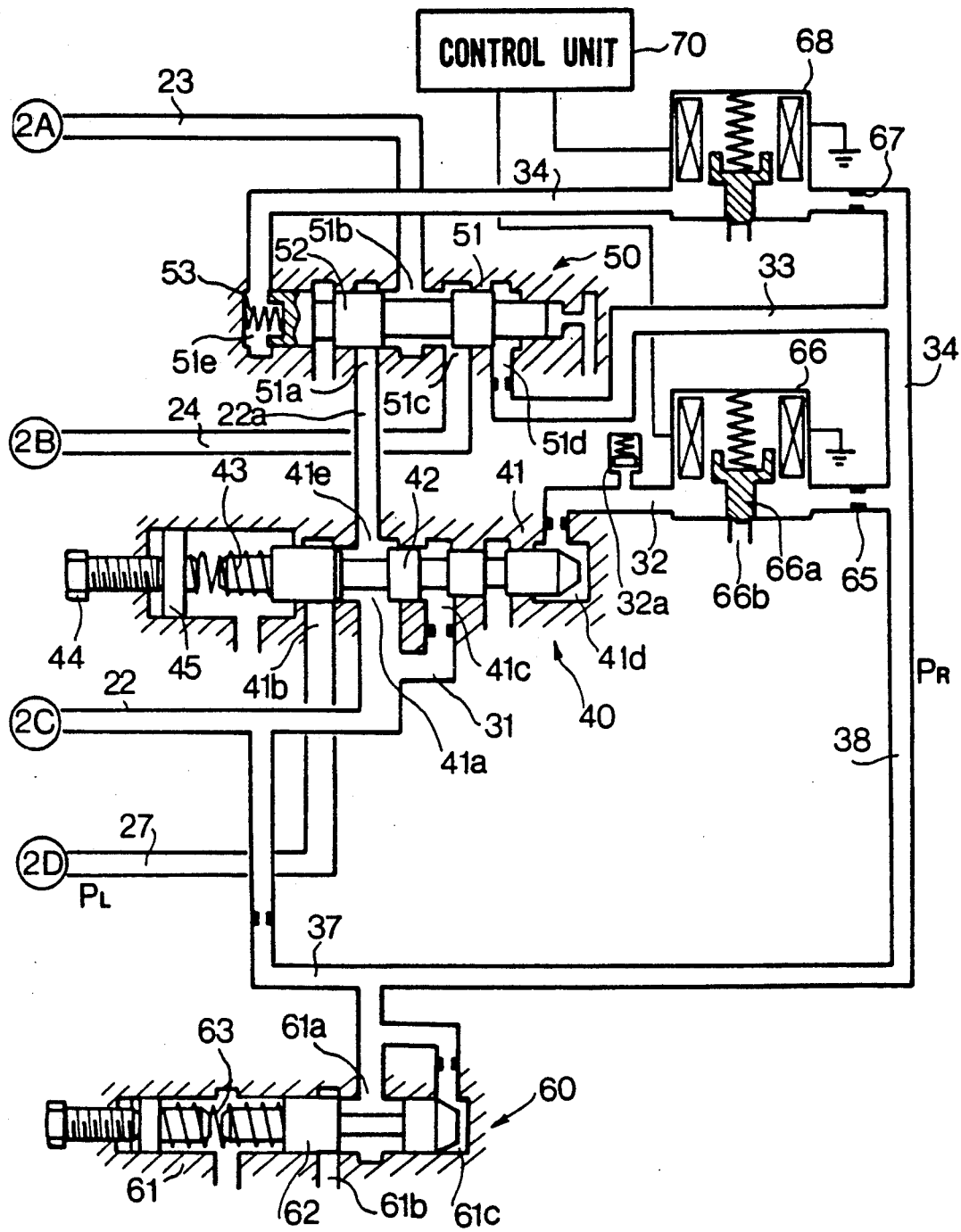

Referring to FIGS. 2a and 2b, a first hydraulic circuit comprises the following circuit. The chamber 9 of the drive pulley 7 is supplied with pressurized oil by an oil pump 21 from an oil reservoir 26 passing through a line pressure conduit 22, ports 41a and 41e of a line pressure control valve 40, a transmission ration control valve 50, and a conduit 23. The chamber 10 of the driven pulley 8 is applied with pressurized oil through a passage 22b without passing through the valves 40 and 50. The movable conical disc 7a of the drive pulley 7 is so designed that the pressure receiving area thereof is larger than that of the movable conical disc 8a of the driven pulley 8. The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the force of a spring 43 provided between the end of the spool 42 and a retainer 45 the position of which is adjustable by a screw 44. The port 41a is communicated with a drain port 41b for a drain passage 27 in accordance with the position of a land of the spool 42. The drain port 41b communicates with oil reservoir 26 through passage 27.

The transmission ratio control valve 50 comprises a valve body 51, spool 52, spring 53 for urging the spool 52 in the downshift direction. A port 51b of the valve body 51 is selectively communicated with a pressure oil supply port 51a or a drain port 52c in accordance with the position of lands of the spool 52. Port 51b communicates with the chamber 9 through conduit 23, and the port 51a communicates with port 41e of the line pressure control valve 40 through conduit 22a. The drain port 52c is communicated with the oil reservoir 26 through a conduit 24 and a check valve 25.

The system is provided with a regulator valve 60, and solenoid operated on-off valves 66 and 68.

The regulator valve 60 comprises a valve body 61, an inlet port 61a connected to the pump 21 through passages 37 and 22, a spool 62, an end chamber 61c connected to the passage 37, and a spring 63 urging the spool 62 to the chamber 61c. When the pressure of oil in the chamber 61c becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid operated on-off valve 66, and passage 32 having an accumulator 32a. Further, the passage 38 is communicated with an end chamber 51d of the transmission ratio control valve 50 through a passage 33, and with another end chamber 51e through an orifice 67, solenoid operated on-off valve 68 and passage 34. The passages 32-34, 37, 38 comprise a second hydraulic circuit. The solenoid operated on-off valve 66 is adapted to be operated by pulses. When energized, a valve 66a opens a drain port 66b. The pulsation of the pressure of oil in the passage 32 is smoothed by accumulator 32a. The solenoid operated on-off valve 68 is the same as valve 66 in construction and operation. The valves 66 and 68 are operated by signals from a control unit 70. Thus, pressure controlled by the valves 66 and 68 is applied to chambers 41d and 51e.

In the transmission ratio control valve 50, pressure receiving area of the spool 52 at chamber 51e is set to a value larger than the area at the chamber 51d. On the other hand, the control pressure in the chamber 51e can be changed between a maximum value, which is the same as the constant pressure in the chamber 51d, when the duty ratio is 0% and zero by controlling the duty ratio of the pulses for operating the valve 68. The transmission ratio control valve 50 is so arranged that the spool 52 is at a neutral position at a middle duty ratio (for example 50%) and is located in an oil supply position by increasing the duty ratio from the middle duty ratio because of the reduction of the control pressure in the chamber 51e. Further, the speed of the movement of the spool 52 changes with the magnitude of changing duty ratio. The spool 52 is shifted to an oil drain position by decreasing the duty ratio. It will be understood that when the oil is supplied to the chamber 9, the transmission is upshifted.

The relationship between the duty ratio of the pulses applied to the solenoid operated control valve 68 and the transmission ratio is explained hereinafter.

The necessary volume V of oil in the chamber 9 is a function of the transmission ratio i, namely:

$$V = f(i)$$

The flow rate Q is obtained by differentiating the volume V with respect to time and expressed as $$Q = dV/dt = df(i)/di \cdot di/dt$$

$$di/dt = f(Q, i)$$

The supply flow rate $Q_s$ and drain flow rate $Q_d$ are presented as $$Q_d = C \cdot S_d \sqrt{2g P_p/\gamma}$$
$$= a \cdot S_d \sqrt{P_p}$$
$$Q_s = a \cdot S_s \sqrt{Pl - P_p}$$

$$a = c \sqrt{2g/\gamma}$$

where
 $P_p$ is the pressure in chamber 9,
 Pl is the line pressure,
 C is the coefficient for the flow rate,
 g is the acceleration of gravity,
 $\gamma$ is the specific gravity of oil,
 $S_s$ is the opening area of the supply port 51a, and
 $S_d$ is the opening area of drain port 52c.

Designating by D the duty ratio of the pulses applied to the control valve, that is the ratio of ON/OFF of the valve, average flow rate Q in one cycle (oil supply state is positive) is $$Q = a(D \cdot S_s \sqrt{Pl - P_p} - (1 - D) \cdot S_d \sqrt{P_p})$$

Assuming a, $S_s$ and $S_d$ to be constants, $$Q = f(D, Pl \cdot P_p)$$

The line pressure Pl is determined by the transmission ratio i and engine torque, and the pressure $P_p$ in the chamber 9 is determined by the transmission ratio i and the line pressure Pl. Accordingly, assuming the engine torque to be constant, $$Q = f(D, i)$$

Since di/dt = f(Q, i)

$$di/dt = f(D, i)$$

$$D = f(di/dt, i)$$

Accordingly, the duty ratio is determined by the transmission ratio changing speed di/dt and the transmission ratio i. In a feedback control system, the transmission ratio changing speed rate di/dt can be determined by the difference between the actual transmission ratio i and a desired transmission ratio id, as follows.

$$di/dt = K1(id - i)$$

where K1 is a coefficient.

Further, if the transmission ratio changing speed di/dt is determined, the duty ratio D can be obtained from the speed. When the actual transmission ratio i is larger than the desired transmission ratio id (i>id), the value of di/dt is negative. In such a state, the duty ratio D is increased to reduce the pressure in the chamber 51e so as to upshift the transmission. The downshift is performed in the reverse manner.

However, the response of the transmission control system including various mechanisms is slow, which means that the conversion of the actual transmission ratio to the desired transmission ratio delays.

In order to eliminate the control delay, the transmission ratio changing speed (rate) di/dt is corrected by the speed (rate) of change the desired transmission ratio (did/dt), as follows.

$$di/dt = K1(id - i) + K2 \, did/dt$$

where K2 is a coefficient.

The desired transmission ratio changing speed (rate) did/dt is to advance the phase of the control operation. Thus, the response of the system can be improved. The speed (rate) did/dt is obtained by the amount ($\Delta$id) of change of the desired transmission ratio at a predetermined intervals ($\Delta$t), that is $\Delta$id/$\Delta$t.

The coefficient K1 may be changed in accordance with the opening degree of the throttle valve, and the coefficient K2 may also be changed in accordance with physical conditions of the system, such as viscosity of oil used in the system.

Referring to FIG. 3, the system is arranged to control the transmission ratio in accordance with the above described principle. In the system, a drive pulley speed sensor 71, driven pulley speed sensor 72, engine speed sensor 73 and throttle position sensor (or intake manifold pressure sensor) 74 are provided. Oil viscosity or other physical conditions are indicated at 81. Output signals $N_p$ and $N_S$ of sensors 71, 72 are fed to an actual transmission ratio calculator 75 to produce an actual transmission ratio i in accordance with i=$N_P/N_S$. Output signal $N_S$ and output signal $\theta$ representing the opening degree of the throttle position sensor 74 are fed to a desired transmission ratio table 76. The desired transmission ratio id is derived from the table 76 in accordance with signals $N_S$ and $\theta$.

The desired transmission ratio id is fed to a desired transmission ratio changing speed (rate) calculator 80 which produces the desired transmission ratio changing speed (rate) did/dt. A coefficient setting section 77 produces coefficients K1 and K2. The actual transmission ratio i, desired transmission ratio id, desired transmission ratio changing speed did/dt and coefficients K1 and K2 are applied to a transmission ratio changing speed calculator 78 to produce the transmission ratio changing speed di/dt from the formula di/dt=K1(id−i)+K2·did/dt.

The speed (rate) di/dt and the actual transmission ratio i are applied to a duty ratio table 79 to derive the duty ratio D. The duty ratio D is supplied to the solenoid operated on off valve 68 through a driver 82.

Further, the output signal $\theta$ of throttle position sensor 74 and the output $N_e$ of engine speed sensor 73 are fed to an engine torque calculator 96, so that engine torque T is calculated based on throttle position and engine speed $N_e$.

On the other hand, the actual transmission ratio i from the calculator 75 is applied to a necessary line pressure table 103 to derive a necessary line pressure $P_{LU}$ per unit torque. The necessary line pressure $P_{LU}$ and the engine torque T are applied to a desired line pressure calculator 104 where a desired line pressure $P_l$ is calculated.

The desired line pressure $P_L$ is applied to a duty ratio table 105 to derive a duty ratio $D_L$ corresponding to the desired line pressure $P_L$. The duty ratio $D_L$ is supplied to a driver 106 which operates the solenoid operated on-off valve 66 at the duty ratio.

In operation, while the vehicle is at a stop, the chamber 10 of the driven pulley 8 is supplied with line pressure through passage 22b, and the chamber 9 of the drive pulley 7 is drained, since $N_P$, $N_s$, $\theta$ and the duty ratio D are zero, and the spool 52 is at the right end position and the drain port 52c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the clutch current increases progressively with increase of engine speed. The electromagnetic clutch 2 is gradually engaged, transmitting the engine power to the drive pulley 7. The power of the engine is transmitted to the output shaft 6 at the largest transmission ratio by the driving belt 11 and driven pulley 8, and is further transmitted to axles of the driving wheels 19. Thus, the vehicle is started. When the vehicle speed (output signal $N_s$) exceeds a predetermined value, the clutch 2 is entirely engaged.

At starting of the vehicle, the line pressure is at the highest value by the pressure control valve 40, since the duty ratio for the valve 66 is large, and the spool 42 of the control valve 40 is at the right end position. When the throttle valve is opened for acceleration of the vehicle, the desired transmission ratio changing speed did/dt and transmission ratio changing speed di/dt are determined or calculated at calculators 80 and 78. The transmission ratio changing speed di/dt is fed to the duty ratio table 79, so that duty ratio D for valve 68 is obtained from the table 79. When the depression of the accelerator pedal stops, the transmission ratio changing speed di/dt becomes negative. Accordingly the value of the duty ratio D becomes larger than the neutral value, so that the pressure in the chamber 51d of the control valve 50 is higher than the chamber 51e. Thus, the spool 52 is shifted to the left to communicate the port 51a with port 51b, so that oil is supplied to the chamber 9 through the conduit 23 to upshift the transmission. When the actual transmission ratio i reaches the desired transmission ratio id, the changing speed di/dt becomes zero, so that the upshifting operation stops.

On the other hand, the duty ratio for the valve 66 is reduced, thereby shifting the spool 42 of the valve 40 to the left. The port 41a communicates with the port 41b of the drain passage 27. Thus, line pressure reduces, and the transmission is upshifted to the desired transmission ratio id at the speed di/dt.

Figure 4:
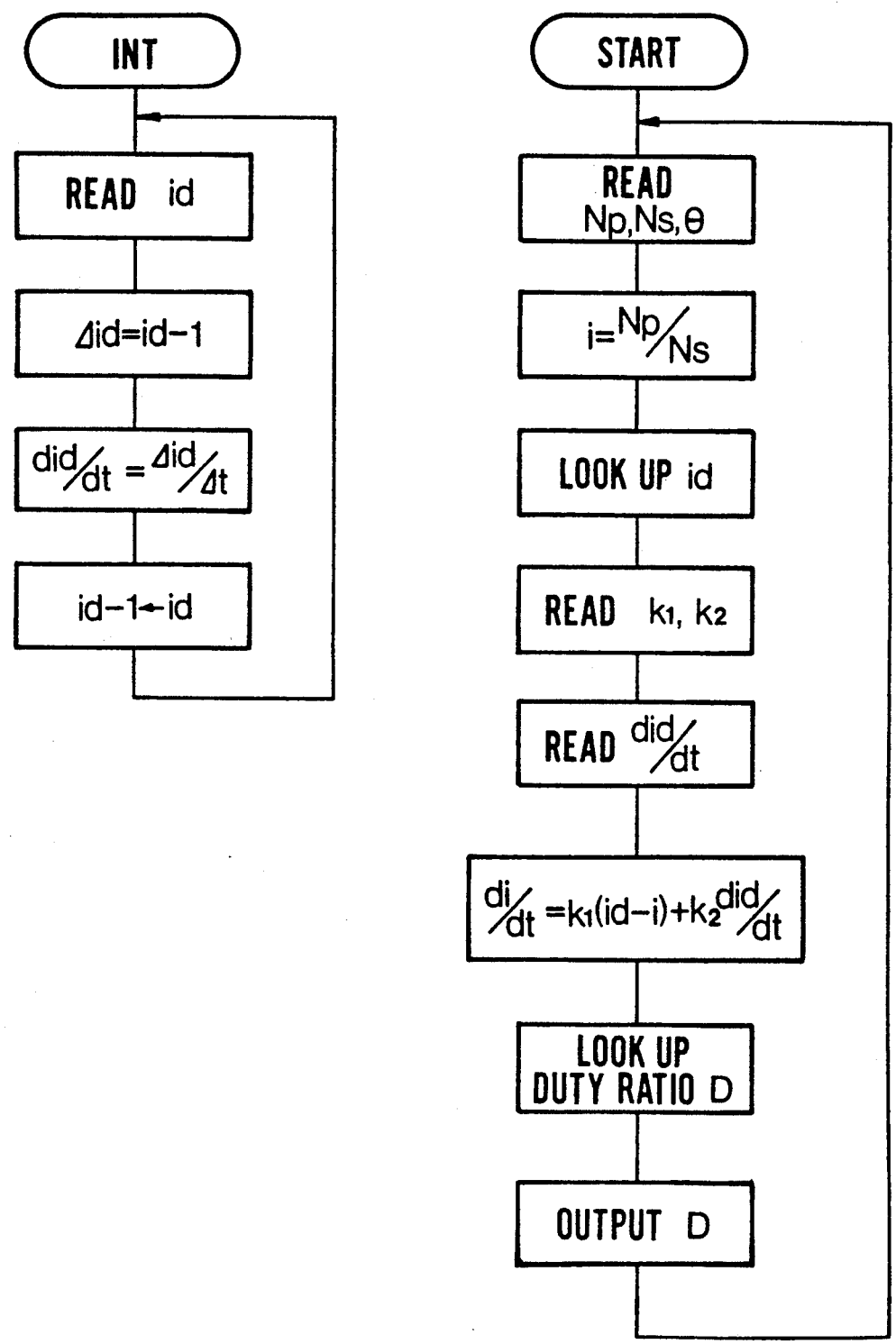
FIG. 4 is a flowchart showing the operation of the system.

As the difference between the desired ratio id and actual ratio i becomes large and the desired transmission ratio changing speed becomes large, the duty ratio for the valve 68 becomes large, thereby increasing the shifting speed of the spool 52 to increase the actual transmission changing speed. When the opening degree of the throttle valve is reduced for deceleration, the duty ratio is reduced along a low engine speed line, thereby shifting the spool 52 to the right to drain the chamber 9. Thus, the transmission is downshifted. The transmission changing speed at downshifting increases with reduction of the duty ratio. FIG. 4 shows the above described operation of transmission ratio control.

The control operation of line pressure will be described hereinafter. From the engine torque calculator 96, a torque T is obtained in accordance with throttle position $\theta$ and engine speed $N_e$, which is applied to desired line pressure calculator 104. The calculator calculates a desired line pressure $P_L$. The solenoid operated on-off valve 66 is operated at a duty ratio corresponding to the desired line pressure $P_L$. The line pressure is applied to chamber 10 to hold the belt 11 at a necessary minimum force, the transmitting torque at which is slightly larger than torque T. Thus, power is transmitted through the transmission without the belt slipping.

Figure 5:
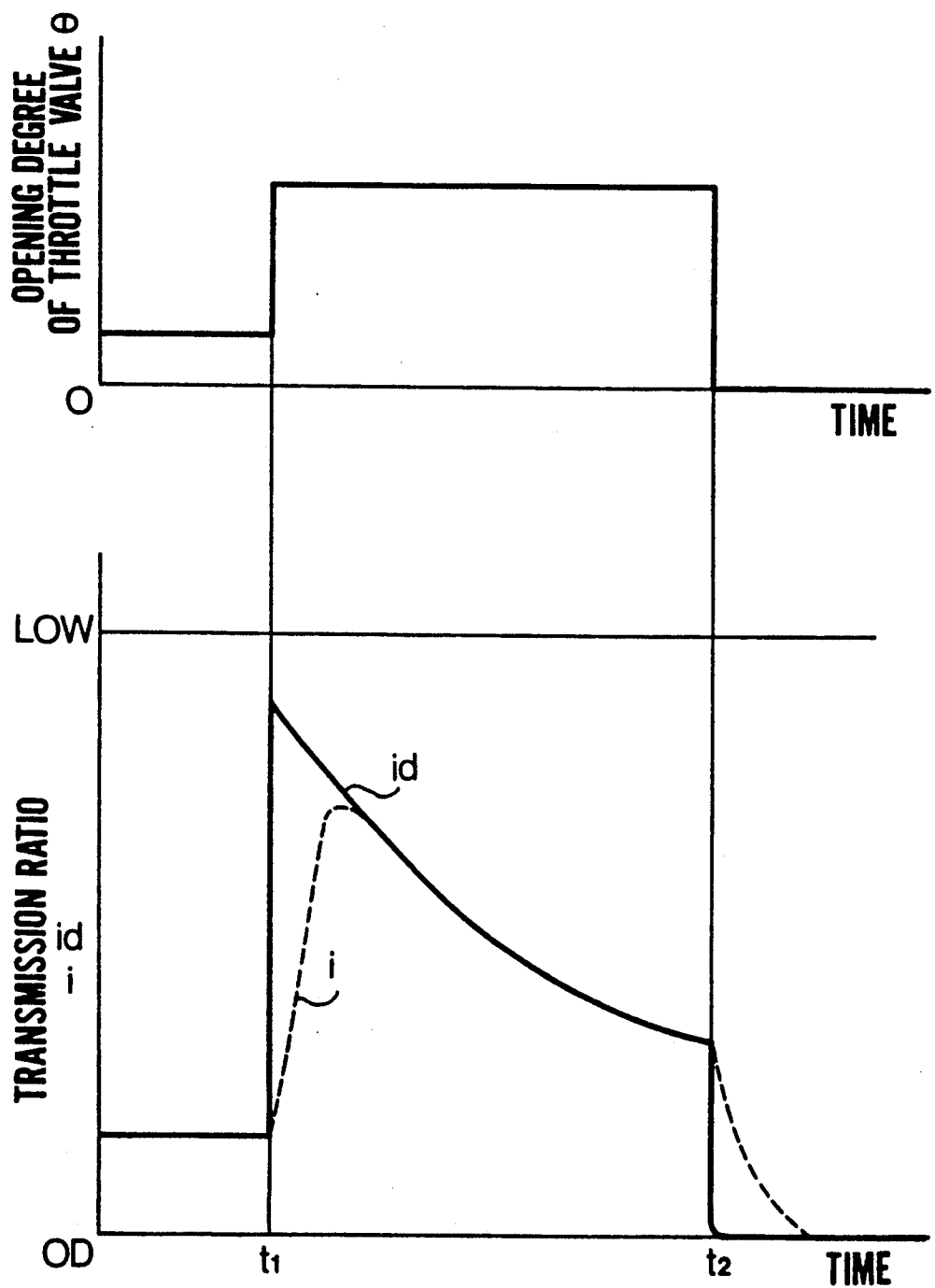
FIGS. 5, 6a, 6b and 6c are graphs showing transmission ratio changing modes.

FIG. 5 shows an example of transmission ratio control. When the accelerator pedal is quickly depressed for the kickdown at time $t_1$, the desired transmission ratio id is rapidly increased in accordance with the opening degree $\theta$ and speed $N_S$ of the driven pulley. Thereafter, the desired transmission ratio id reduces at the speed did/dt as speed $N_S$ (vehicle speed) increases. The actual transmission ratio i increases in accordance mainly with the difference K1 (id-i) to the desired transmission ratio id. As, the actual transmission ratio i approaches the desired transmission ratio id, the actual transmission ratio i gradually reduces so as to smoothly coincide with the desired transmission ratio id in accordance with the change of K2·did/dt. When the accelerator pedal is released at time $t_2$ the actual transmission ratio i converges to the desired transmission ratio id in the same manner as the kickdown. OD represents overdrive transmission ratio.

Figure 6:
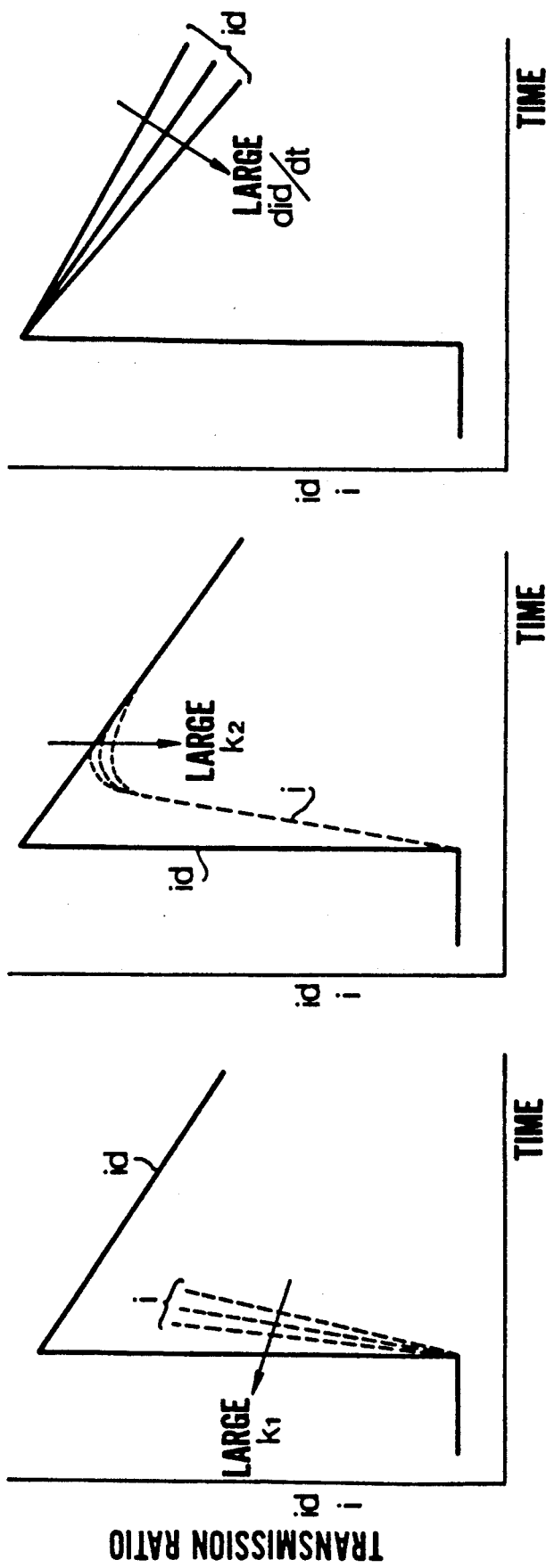

As shown in FIG. 6a, as the coefficient $K_1$ increases, the conversion characteristic of the actual transmission ratio i increases. The phase of the peak of the actual transmission ratio i advances as the coefficient $K_2$ increases, as shown in FIG. 6b. The changing speed of the desired ratio id increases with increase of the desired transmission ratio changing speed did/dt, as shown in FIG. 6c.

In the system of FIG. 3, although the calculation of $di/dt = K_1 (id-31\ i) + K_2 \cdot did/dt$ is made in the calculator 78, the equation can be rewritten as follows.

$$di/dt = k_1(id + K_2/K_1 \cdot did/dt - i)$$

Namely, the transmission ratio changing speed di/dt can be obtained by correcting the desired transmission ratio id with changing speed thereof (did/dt) and by the difference between the corrected desired transmission ratio id and the actual transmission ratio i.

Figure 7:
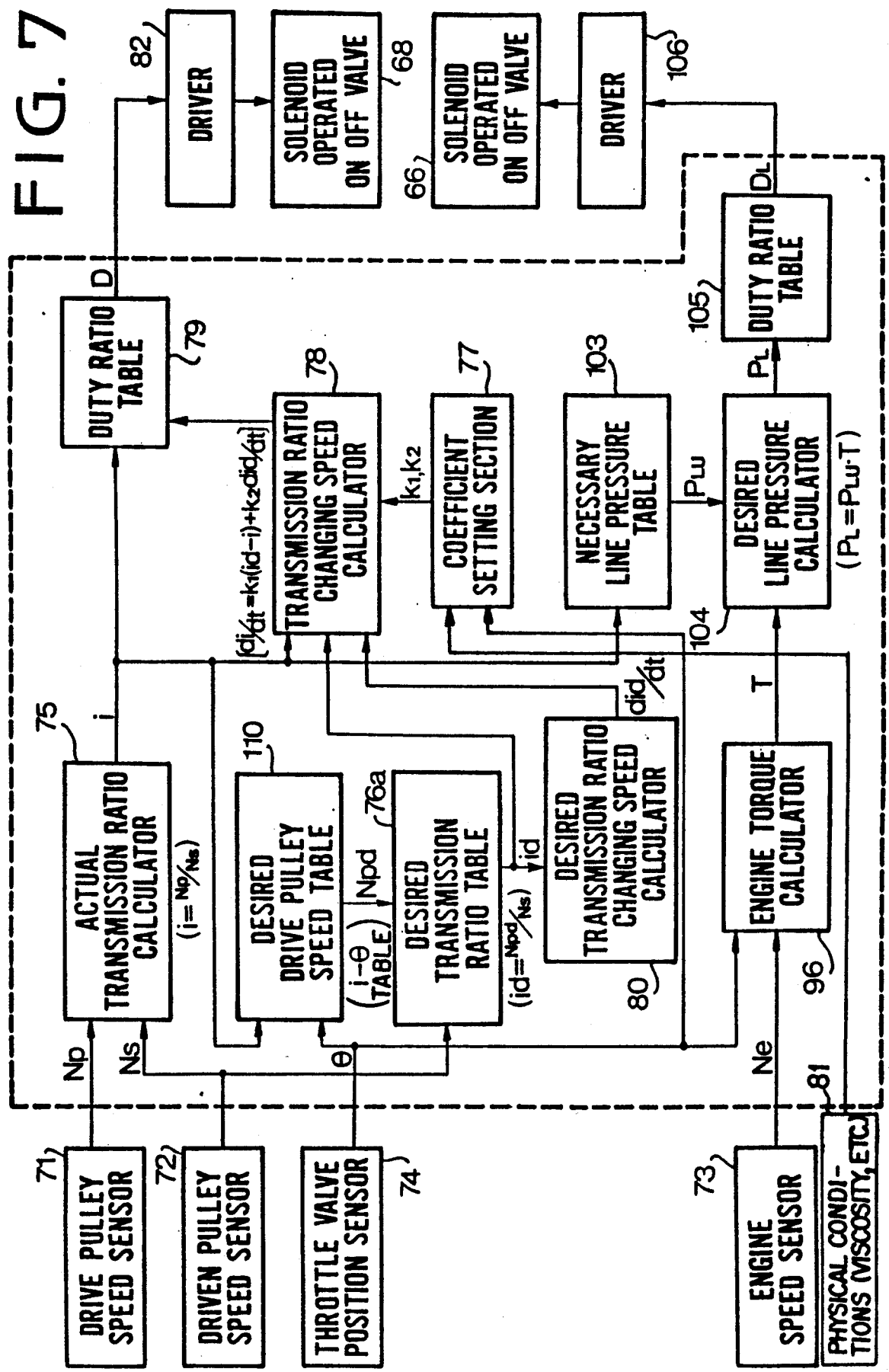
FIG. 7 is a block diagram showing another embodiment of the invention.
Figure 8:
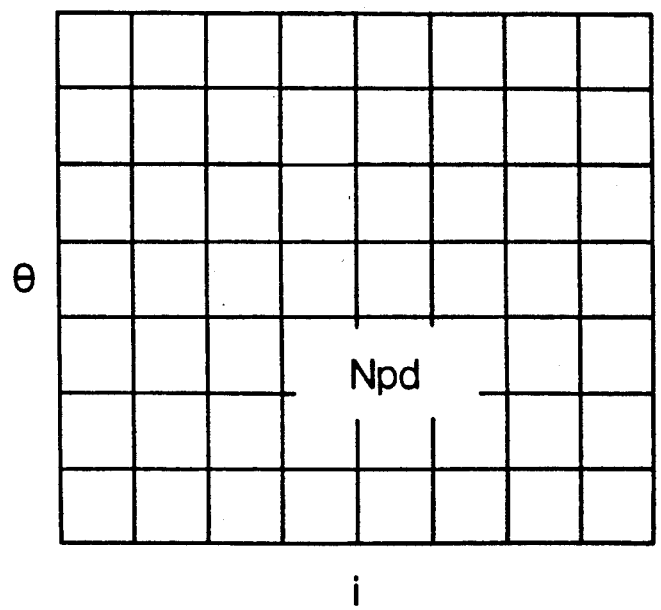
FIG. 8 is a look-up table for desired pulley speed.

Referring to FIG. 7 showing another embodiment of the invention, the system is provided with a desired drive pulley speed table 110. A desired speed $N_Pd$ in the table 110 is derived in accordance with the actual transmission ratio i and throttle valve opening degree $\theta$, as shown in FIG. 8. The desired drive pulley speed $N_Pd$ and the driven pulley speed $N_S$ are fed to the desired transmission ratio table 76a where calculation of $id = N_Pd/N_S$ is made. Other components of the system are the same as the first embodiment and identified by the same references as FIG. 3. The operation of the system is the same as the first embodiment except for the operations of table 110 and the table 76a.

While the presently preferred embodiments of the present invention have been shown and described, it is to be understood that this disclosure is for the purpose of illustration and that various changes and modifications may be made without departing from the spirit and scope of the invention as set forth in the appended claims.

What is claimed is:

1. In a control system for control operation of a continuously variable transmission for transmitting the power of an internal combustion engine, the transmission comprising a drive pulley having a hydraulically shiftable first disc and a first hydraulic cylinder for operating the disc, a driven pulley having a hydraulically shiftable second disc and a second hydraulic cylinder for operating the second disc, and a belt engaged with both pulleys, the control system including a first hydraulic circuit having a pump for supplying oil to both of said hydraulic cylinders, a transmission ratio control valve having a spool for controlling the oil supplied to the first hydraulic cylinder to change the transmission ratio of the transmission to a desired transmission ratio, and shifting means for shifting the spool, the improvement in the control system comprising sensing means for sensing operating conditions of the engine and the transmission and for producing condition signals dependent on the conditions, first means responsive to the condition signals for producing a desired transmission ratio signal and an actual transmission ratio signal, desired transmission ratio changing speed calculating means responsive to the desired transmission ratio signal for producing a desired transmission ratio changing speed signal, transmission ratio changing speed calculating means responsive to the desired transmission ratio, the actual transmission ratio and the desired transmission ratio changing speed signals for producing an actual transmission ratio changing speed signal, driving means responsive to the actual transmission ratio changing speed signal and the actual transmission ratio signal for operating the shifting means, so as to advance a phase of the control operation for eliminating control delay, coefficient setting means for producing a first coefficient signal in relation to an opening degree of a throttle valve of the engine and a second coefficient signal in relation to a physical condition of the system, and said transmission ratio changing speed calculating means being further responsive to said coefficient signals.

2. The control system according to claim 1 wherein the transmission ratio control valve has chambers at both ends of the spool, the shifting means includes a second hydraulic circuit for supplying control oil to the chambers, and control valve means provided in the second hydraulic circuit for controlling flow rate of the control oil supplied to the chambers of the transmission ratio control valve.

3. The control system according to claim 2 wherein the transmission ratio control valve has a spring for urging the spool to a drain position.

4. The control system according to claim 2 wherein the transmission ratio control valve is arranged to supply the control oil to a small area portion of the spool.

5. The control system according to claim 2 wherein the control valve means is a solenoid operated on-off valve, and a control signal of the driving means is in pulses, the duty ratio of which is changed so as to control the transmission ratio changing speed.

6. The control system according to claim 2 wherein the second hydraulic circuit is provided with a regulator valve for maintaining the pressure of oil therein at a constant value.

7. The control system according to claim 1 wherein the sensing means comprises a drive pulley speed sensor, driven pulley speed sensor and throttle valve position sensor.

8. The control system according to claim 8, wherein said sensing means comprises throttle position sensing means for producing a throttle position signal responsive to the opening degree of the throttle valve of the engine, driven pulley speed sensing means for producing a driven pulley speed signal as a function of driven pulley speed of the driven pulley, drive pulley speed sensing means for producing a drive pulley speed signal as a function of drive pulley speed of the drive pulley, said first means comprises an actual transmission ratio calculator for calculating the actual transmission ratio signal, wherein said first means further comprises a desired transmission ratio means for producing the desired transmission ratio signal in response to said throttle position signal and said driven pulley speed signal, and wherein said actual transmission ratio calculator calculates the actual transmission ratio signal in response to said drive and driven speed signals.

9. The control system according to claim 8, wherein said desired transmission ratio means includes a desired drive pulley speed table providing a desired drive pulley speed signal from said throttle position signal and the actual transmission ratio signal, and a desired transmission ratio device for providing the desired transmission ratio signal from said desired drive pulley speed signal and said driven pulley speed signal.

10. The control system according to claim 9, wherein said desired transmission ratio device comprises a desired transmission ratio table.

11. The control system according to claim 1, wherein said transmission ratio changing speed calculating means is responsive to said coefficient signals for producing said actual transmission ratio changing speed signal as a function of a first term which is a multiplication of said first coefficient signal and the difference between said actual and desired transmission ratio signals and addition of said first term to a multiplication of said second coefficient signal and said desired transmission ratio changing speed signal.

12. The control system according to claim 1, wherein said physical condition is viscosity of the system.

13. The control system according to claim 1, wherein said desired transmission ratio changing speed calculating means produces said desired transmission ratio changing speed signal as a calculation of rate of change of said desired transmission ratio signal.

14. The control system according to claim 13, wherein said desired transmission ratio changing speed calculating means calculates the rate of change of said desired transmission ratio signal by the amount of change of said desired transmission ratio signal at predetermined time intervals.

* * * * *